3,218,327
α-NAPHTHYLAMINE ALKYL PIPERIDINE COMPOUNDS

Edward F. Elslager, Donald F. Worth, David B. Capps, and Leslie M. Werbel, Ann Arbor, Mich., assignors to Parke, Davis & Company, Detroit, Mich., a corporation of Michigan
No Drawing. Filed Oct. 2, 1963, Ser. No. 313,174
6 Claims. (Cl. 260—293)

This application is a continuation-in-part of our copending application Serial No. 14,523, filed March 14, 1960, now Patent No. 3,139,421.

This invention relates to α-naphthylamine compounds having in free base form the formula (I)

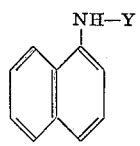

and acid addition salts thereof where Y represents the group (II)

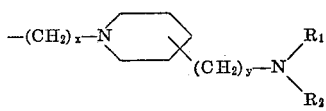

in which $x$ is an integer from 2 to 3, $y$ is an integer from 0 to 3 inclusive, and $R_1$ and $R_2$ independently represent a lower alkyl of 1 to 3 carbon atoms inclusive (preferably methyl or ethyl) or when taken together with —N< represent a heterocyclic group such as pyrrolidinyl or piperidinyl.

The compounds of the invention are intermediates for the production of 4-(dialkylaminoalkylamino)-1-naphthylazo heterocyclic compounds as described in our copending application Serial No. 14,523 filed March 14, 1960, now Patent No. 3,139,421. Additionally, the compounds of the invention possess significant pharmacological properties when administered orally; in particular, they inhibit cholesterol synthesis at well tolerated dose levels in vivo as demonstrated in standard assay tests.

The compounds of the invention are produced by condensing N-(omega-bromoalkyl)-1-naphthylamine of formula

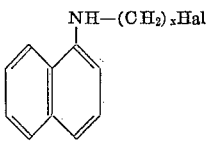

with a dialkylaminoalkylpiperidine compound of formula

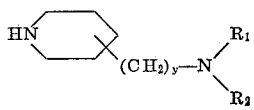

in the presence of acid binding agent; where Hal represents a halogen atom (preferably bromine) and $x$, $y$, $R_1$ and $R_2$ have the above specified significance. The reaction is preferably carried out in a solvent medium which solvent may be the piperidine compound (employed in excess) or it may be an inert organic solvent such as dimethylformamide or a hydrocarbon, e.g., benzene, xylene and toluene. The acid binding agent may be the piperidine compound employed in excess in which case, as indicated, the piperidine compound can also serve as a solvent. Other suitable acid binding agents are tertiary amines, ammonium hydroxide or alkali metal hydroxides. The proportion of the reactants is not critical; however, best results are obtained with excess piperidine compound. The piperidine compound may be employed for the reaction in free base form or it may be used in acid salt form and the free base generated in situ in the presence of acid binding agent such as aqueous ammonium hydroxide. The reaction is favored by temperatures in excess of 50° C. and is preferably carried out at the reflux temperature of the reaction mixture up to about 150° C. At these temperatures the reaction is ordinarily complete in about 10 to 40 hours. At higher temperature, there is a tendency for loss of the desired products because of decomposition.

The compounds of the invention, as indicated, occur both in free base and acid addition salt form. The acid addition salts are formed by reaction of the free base with an organic or inorganic acid according to methods which per se are conventional. Conversely, the acid addition salts can be converted to the corresponding free base form by neutralization with a base. The invention contemplates the acid addition salts broadly. Some examples of organic and inorganic acids which can be used to produce the corresponding acid addition salts are hydrochloric, hydrobromic, hydroiodic, sulfuric, phosphoric, oxalic, sulfamic, lactic, tartaric, gluconic and citric acids. The acid addition salts are preferred for uses in which increased water solubility is desired.

The invention is illustrated by the following examples.

Example 1

A mixture of 118 g. (0.36 mole) of N-(2-bromoethyl)-1-naphthylamine hydrobromide and 147 g. of 4-(2-diethylaminoethyl)-piperidine (0.80 mole) is stirred and refluxed in 500 ml. of xylene for 30 hours. Upon cooling, one liter of 10% aqueous sodium hydroxide solution is added and the mixture stirred until two layers are formed. The aqueous layer is separated and extracted with 200 ml. of benzene. The combined benzene-xylene layers are dried over anhydrous potassium carbonate and the solvent removed in vacuo. Distillation of the residue in vacuo through an 8-inch Vigreux column gives the desired product, 4-(2-diethylaminoethyl)-1-[2-(1-naphthylamino)ethyl]piperidine, B.P. 208–209° C./0.2 mm., $n_D^{25}$ 1.5795.

The corresponding dihydrochloride salt is obtained by treating an isopropanolic solution of the free base with excess dry hydrogen chloride; the hydrobromide, sulfate, sulfamate and p-toluenesulfonate disalts can be prepared by treatment of an isopropanolic solution of the free base with two equivalents of the corresponding acid.

The 1-naphthylamine starting material can be prepared as follows: a solution of one kilogram (25 moles) of ethylene oxide in 10 liters of 95% ethanol (kept at 0° C. to minimize the evaporation of ethylene oxide) is added in a slow stream over a period of 3 hours to a solution of 3.25 kg. (22.7 moles) of 1-naphthylamine in 15 liters of 95% ethanol with stirring, maintaining the temperature at 0° C. during the addition. The reaction does not appear to be exothermic and no color change is noted. After the addition is complete, the reaction mixture is allowed to stand at room temperature for 16 hours and then boiled under reflux for 3 hours. The volatile materials are removed in vacuo on the steam bath and the residue distilled under high vacuum through an 8-inch Vigreux column to give N-(2-hydroxyethyl)-1-naphthylamine as a colorless syrupy liquid, B.P. 157–161° C./0.25 mm., which solidifies in the receiver. A mixture of one kilogram (5.35 moles) of N-(2-hydroxyethyl)-1-naphthylamine and 9 liters of constant boiling hydrobromic acid (48%) is boiled under reflux for 24 hours with mechanical stirring. Reflux is adjusted so that approximately 500 ml. of the condensed hydrobromic acid-water mixture is collected during this period. Upon cooling, the desired N-(2-bromoethyl)-1-naphthylamine hydrobromide which separates is collected by filtration, the filter cake is sucked dry, and the product digested thoroughly by stirring with 3 liters of boiling 2-propanol. The occluded brown impurities dissolve and the off-white crystals are collected by filtration, washed with fresh cold 2-propanol and dried in vacuo at 50° C. for 24 to 48 hours; the product softens at 200° C. and melts at 208–211° C.

Example 2

N-(2-bromoethyl)-1-naphthylamine hydrobromide (167 g., 0.5 mole) is suspended in excess aqueous ammonium hydroxide and extracted with several portions of xylene (total volume 1.5 liters). The xylene solution is dried over anhydrous magnesium sulfate, 200 g. (1.1 moles) of 4-[2-(1-piperidino)ethyl]piperidine is added, and the mixture heated under reflux with stirring for 20 hrs. The reaction mixture is cooled, 500 ml. of 10% sodium hydroxide is added, and the mixture is stirred for one hour. The layers are separated, the aqueous layer is shaken with 200 ml. of xylene, and the xylene solutions are combined and dried over anhydrous sodium sulfate. The drying agent is collected by filtration and volatile materials removed from the filtrate in vacuo. The residue is dissolved in hot 2-propanol, the solution is treated with decolorizing charcoal and filtered, and the 2-propanol removed in vacuo. The residual product, 1' - [2 - (1 - naphthylamino)ethyl] - 1,4' - ethylenedipiperidine, is taken up in 2-propanol and treated with an excess of a 2-propanol-hydrogen chloride mixture. The acid addition salt product, 1'-[2-(1-naphthylamino)ethyl]-1,4'-ethylenedipiperidine, dihydrochloride, separates and is collected by filtration; M.P. 221–224° C. after crystallization from methanol-ethanol mixture.

In like manner, the following related compounds can be prepared by reacting one-half mole of N-(2-bromoethyl)-1-naphthylamine with 1.1 moles of 4-(2-dimethylaminoethyl)piperidine, 2-[2-(1-piperidinyl)ethyl]piperidine or 4-[2-(1-pyrrolidinyl)ethyl]piperidine, respectively:

4 - (2 - dimethylaminoethyl) - 1 - [2 - (1 - naphthylamino)ethyl]piperidine, dihydrochloride, ⅓ hydrate, M.P. 227–231° C.

1' - [2 - (1 - naphthylamino)ethyl] - 1,2' - ethylenedipiperidine, dihydrochloride, M.P. 185–188° C.

1 - [2 - (1 - naphthylamino)ethyl] - 4 - [2 - (1 - pyrrolidinyl)ethyl]piperidine, dihydrochloride, M.P. 258–262° C.

Example 3

N-(3-bromopropyl)-1-naphthylamine hydrobromide (173 g., 0.5 mole, M.P. 152–154° C.) is converted to the corresponding free base and reacted with 4-[2-(1-pyrrolidinyl)ethyl]piperidine (200 mg., 1.1 moles) in xylene according to the procedure described in Example 2. The reaction mixture is cooled, treated with sodium hydroxide and the aqueous and organic layers processed as in Example 2. The residual product, after drying and removal of xylene, is 1-[3-(1-naphthylamino)propyl]-4-[2-(1-pyrrolidinyl)ethyl]piperidine.

When the free base in 2-propanol solution is treated with excess hydrogen chloride, the corresponding dihydrochloride salt is obtained as off-white crystals, M.P. 238–241° C.

In like manner, the following related compounds can be prepared, starting from N-(3-bromopropyl)-1-naphthylamine and the appropriate [2-(dialkylamino)ethyl]piperidine:

4 - (2 - diethylaminoethyl) - 1 - [3 - (1 - naphthylamino)propyl]piperidine, dihydrochloride 1' - [3 - (1 - naphthylamino)propyl] - 1,4' - ethylenedipiperidine, dihydrochloride N-(3-bromopropyl) - 1 - naphthylamine hydrobromide, M.P. 152–154° C., employed as a starting material in the above preparation, is readily prepared from N-(3-hydroxypropyl)-1-naphthylamine and hydrobromic acid according to the method of Example 1 for the preparation of N-(2-bromoethyl)-1-naphthylamine hydrobromide.

Example 4

Xylene solutions of N-(2-bromoethyl)-1-naphthylamine (25.0 g., 0.1 mole) and 1,4'-bipiperidine (25.2 g., 0.15 mole) are allowed to react according to the procedure described under Example 2 herein. Crystallization of the hydrochloride salt from a methanol-2-propanol mixture gives the desired product, 1'-[2-(1-naphthylamino)ethyl]-1,4'-dipiperidine, dihydrochloride, M.P. 335° C. dec.

In like manner, the following related compounds can be prepared, starting from the appropriate N-(bromoalkyl)-1-naphthylamine and dialkylaminopiperidine compounds:

1 - [2 - (1 - naphthylamino)ethyl] - 4 - (1 - pyrrolidinyl)piperidine, dihydrochloride 4 - diethylamino - 1 - [3 - (1 - naphthylamino)propyl]piperidine, dihydrochloride 2 - dimethylaminomethyl - 1 - [2 - (1 - naphthylamino)ethyl]piperidine, dihydrochloride 1 - [2 - (1 - naphthylamino)ethyl] - 4 - [(1 - pyrrolidinyl)methyl]piperidine, dihydrochloride

We claim:

1. A member selected from the group consisting of a free base of formula $$NH-(CH_2)_x-N\underset{(CH_2)_y-N}{\diagup}\diagdown\underset{R_2}{\diagup}^{R_1}$$

and acid addition salts thereof; in which $x$ is an integer from 2 to 3, $y$ is an integer from 0 to 3 inclusive, $$-N\diagdown_{R_2}^{R_1}$$

represents a member selected from the group consisting of pyrrolidinyl, piperidinyl and $$N\diagdown_{alkyl}^{alkyl}$$

wherein the alkyl groups each contain 1 to 3 carbon atoms inclusive.

2. 1' - [2 - (1 - naphthylamino)ethyl]1,4' - ethylenedipiperidine, dihydrochloride.

3. 4 - (2 - diethylaminoethyl)1 - [2 - (1 - naphthylamino)ethyl]piperidine.

4. 1' - [2 - (1 - naphthylamino)ethyl] - 1,2' - ethylenedipiperidine, dihydrochloride.

5. 1 - [3 - (1 - naphthylamino)propyl] - 4 - [2 - (1-pyrrolidinyl)ethyl]piperidine, dihydrochloride.

6. 1' - [2 - (1 - naphthylamino)ethyl] - 1,4' - dipiperidine, dihydrochloride.

No references cited.

WALTER A. MODANCE, *Primary Examiner.*